G. TANOMURA.
DRAWN PIPE AND PROCESS OF STRETCHING SAME.
APPLICATION FILED JUNE 17, 1920.

1,415,415.  
Patented May 9, 1922.

INVENTOR  
BY Genji Tanomura,  
ATTORNEY

UNITED STATES PATENT OFFICE.

GENJI TANOMURA, OF TOKYO, JAPAN.

DRAWN PIPE AND PROCESS OF STRETCHING SAME.

1,415,415.  Specification of Letters Patent.  Patented May 9, 1922.

Application filed June 17, 1920. Serial No. 389,713.

*To all whom it may concern:*

Be it known that I, GENJI TANOMURA, a subject of the Emperor of Japan, and a resident of No. 25, Nichome, Tenjincho, Yushima, Hongo-Ku, Tokyo, Empire of Japan, have invented new and useful Improvements in Drawn Pipes and Processes of Stretching Same, of which the following is a specification.

This invention relates in general to a method of drawing tubular bars and relates more particularly to a method of stretching metal pipes. One of the primary objects of my invention consists in an improved method of stretching or drawing out metal pipes in such manner as to simplify and cheapen the method particularly by avoiding the necessity of using internal cores or dies the use of which unavoidably renders the operation troublesome in previously used methods.

Another object of the invention resides in the provision of an improved method of drawing out metal pipes whereby the contour in the exterior surface as well as the central bore is maintained true and uniform, substantially in accordance with the decreasing degree of the pipe being drawn.

A still further object of the invention resides in the provision of an improved method of stretching metal pipes which is not only practically efficient for drawing the pipes of relatively small diameter but at the same time equally applicable to and efficient for drawing the pipes of any other cross sections such for example as three sided pipe, rectangular, hexagonal, elliptical, or the like.

A still further object of the invention resides in the provision of an improved method of drawing metal pipe, whereby a product of maximum strength and length as well as minimum thickness of the wall is obtained, and in which the thickness of the wall is duly proportioned to the degree to which the pipe is stretched.

One of the more specific of the objects of the invention is the provision of an improved method of stretching metal pipes by using a liquid core, instead of an ordinary internal die, which is to be filled in the central opening of the pipe to be operated upon in the manner hereinafter described.

In the accompanying drawing:—

Figure 1:
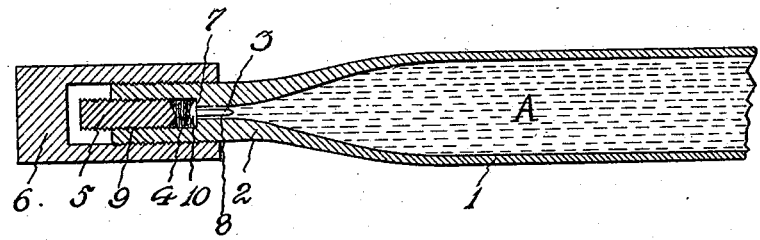
Fig. 1 is a sectional view of one end of a pipe as prepared for drawing, in accordance with my improved method.
Figure 2:
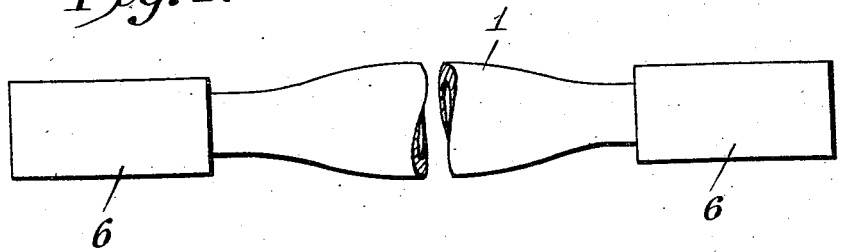
Fig. 2 is an elevation of the same, showing both ends of the pipe.

In order to more readily understand the invention I have appended hereunto a sheet of drawings wherein the metal pipe to be operated upon under the present method is represented by reference numeral 1. Both ends of the pipe are first tapered by suitable means until they are reduced in size, preferably approximately to one third of the original diameter of the pipe so that the thickness in the bore wall thereof is relatively increased as shown at 2.

I then proceed to seal up the opening ends of the said reduced portions of the pipe, prior to the filling of the necessary liquid A which serves as an internal core and which produces the effects to attain the objects above mentioned. For this purpose there is provided internally of the bore wall of the reduced portions of the pipe a step or shoulder 7, formed by enlarging the outer portion of the bore wall of the reduced ends of the pipe, thus dividing this portion of the bore of the pipe into two sections, the outer larger opening section 9 and the inner smaller narrow opening section 8, respectively. The shoulder 7 is aimed to engage the head 10 of the pin 3 when the latter is inserted through the inner narrow opening 8, whilst the outer larger opening 9 which is internally threaded is adapted to engage the externally threaded plug 5 so as to seal up the outer larger opening 9 tight, a suitable packing member 4 being placed between the plug 5 and pin 3, as shown.

The pipe thus assembled and properly annealed is now ready to undergo drawing operation in the usual manner, by connecting through a connecting member 6 with a suitable stretching device which forms no part of my invention and shall not be described.

It will be seen that many modifications can be made in the manner of closing the end openings of the pipe, and I do not wish to limit myself to the feature above described.

Having described my invention, what I claim is:—

1. The method of preparing a pipe for drawing, consisting in filling the pipe with liquid, closing the ends of the pipe, and providing the same at one end with a connecting member for attachment to a stretching means.

2. The method of preparing a pipe for drawing, consisting in reducing the ends and thickening the wall thereof at the ends, filling the pipe with liquid, providing closures for the ends, and providing the pipe at one end with a connecting member for attachment to a stretching means.

In testimony whereof I affix my signature in presence of two witnesses.

GENJI TANOMURA.

Witnesses:
M. W. SMITH,
W. A. GALLOWAY.